(12) United States Patent
Marshall et al.

(10) Patent No.: US 7,935,236 B2
(45) Date of Patent: May 3, 2011

(54) ELECTRO-OSMOTIC PULSE (EOP) TREATMENT METHOD

(75) Inventors: Orange S. Marshall, Champaign, IL (US); Sean Morefield, Champaign, IL (US); Michael K. McInerney, Champaign, IL (US); Vincent F. Hock, Jr., Mahomet, IL (US); Paul D. Femmer, Chesterfield, MO (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1253 days.

(21) Appl. No.: 11/448,887

(22) Filed: Jun. 8, 2006

(65) Prior Publication Data

US 2007/0068814 A1     Mar. 29, 2007

Related U.S. Application Data

(63) Continuation-in-part of application No. 11/141,509, filed on Jun. 1, 2005, now Pat. No. 7,763,155, which is a continuation-in-part of application No. 10/140,875, filed on May 9, 2002, now Pat. No. 6,919,005.

(51) Int. Cl.
    *E02D 31/02* (2006.01)
(52) U.S. Cl. .................... 204/515; 204/228.1
(58) Field of Classification Search .................... 204/515
    See application file for complete search history.

(56) References Cited

U.S. PATENT DOCUMENTS

| | | | |
|---|---|---|---|
| 3,265,526 A | 8/1966 | Beer | |
| 3,632,498 A | 1/1972 | Beer | |
| 3,711,385 A | 1/1973 | Beer | |
| 3,856,646 A | 12/1974 | Morarau | |
| 4,528,084 A | 7/1985 | Beer et al. | |
| 5,055,169 A | 10/1991 | Hock et al. | |
| 5,062,934 A | 11/1991 | Mussinellil | |
| 5,296,120 A * | 3/1994 | Bennett et al. | 204/196.33 |
| 5,312,526 A | 5/1994 | Miller | |
| 5,368,709 A | 11/1994 | Utklev | |
| 5,755,945 A | 5/1998 | Kristiansen | |
| 6,117,295 A * | 9/2000 | Bjerke et al. | 204/515 |
| 6,126,802 A | 10/2000 | Utklev | |
| 6,270,643 B1 | 8/2001 | Finnebraaten | |
| 6,919,005 B2 * | 7/2005 | McInerney et al. | 204/515 |

OTHER PUBLICATIONS

U.S. Appl. No. 11/141,509, filed Jun. 1, 2005, Morefield et al.

* cited by examiner

*Primary Examiner* — Arun S Phasge
(74) *Attorney, Agent, or Firm* — Earl H. Baugher, Jr.

(57) ABSTRACT

A system and method for de-watering porous material, e.g., concrete. In select embodiments, durable, dimensionally stable anodes (DDAs), preferably configured as arrays on a strip, are impressed into the concrete and a pulsed signal is provided by a DC power supply to the DDAs and cathode rods inserted in soil. The DDAs comprise a valve metal substrate mesh having a semi-conductive coating of a precious metal, cement or ceramic. In select embodiments, conducting grout of a hydraulic cement-based mineral-aggregate may be used to emplace the DDAs. In select embodiments, a single cycle of the signal comprises a pulse train consisting of an initial positive pulse followed by a shorter duration negative pulse and ending with a short off period before re-cycling. The cycles continue until the porous material has been sufficiently treated.

22 Claims, 4 Drawing Sheets

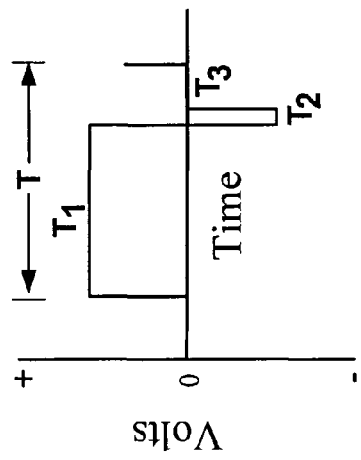
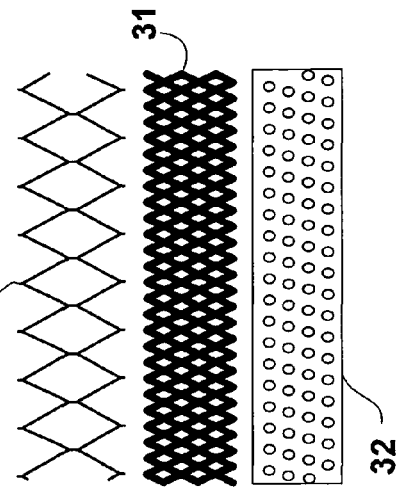
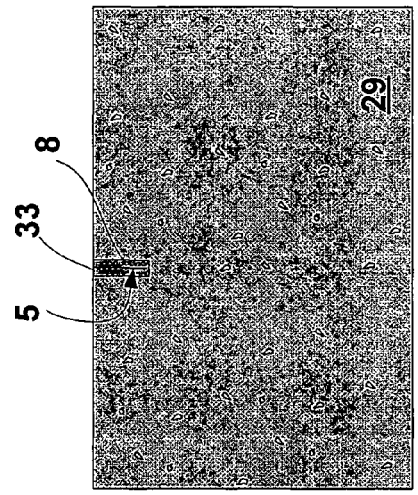
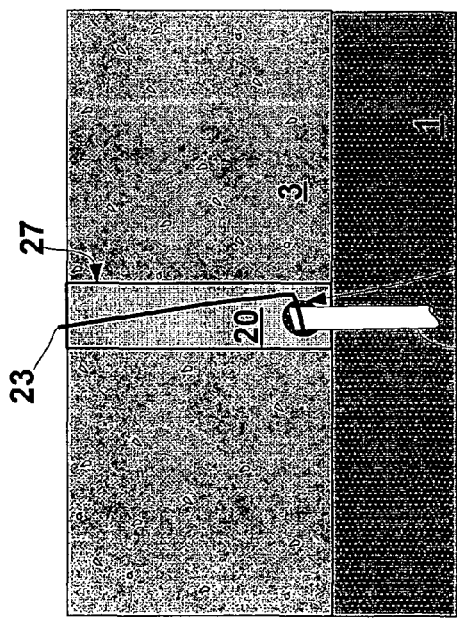
Fig. 3
Fig. 4
Fig. 5

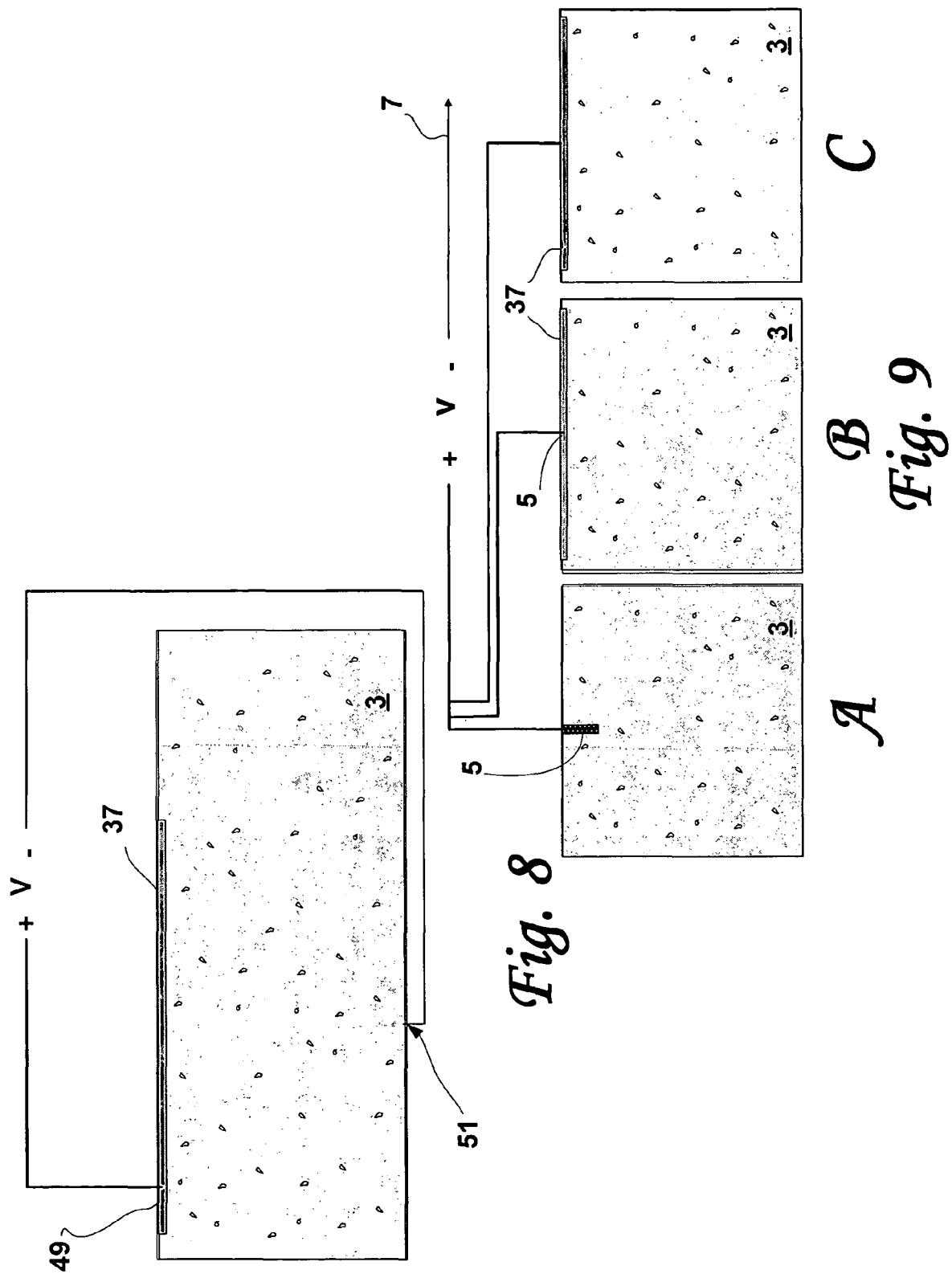

ELECTRO-OSMOTIC PULSE (EOP) TREATMENT METHOD

RELATED INVENTIONS

Under 35U.S.C §121, this application is a continuation-in-part of, and claims the benefit of, application Ser. No. 11/141,509, filed Jun. 1, 2005 now U.S. Pat. No. 7,763,155 A1, Electro-Osmotic Pulse (EOP) System For De-Watering Around Manmade Structures And Method Of Use Therefor, to Malone et al., issued Jul. 27, 2010, which is a continuation-in-part of application Ser. No. 10/140,875, filed May 9, 2002 now U.S. Pat. No. 6,919,005, Configuration And Electro-Osmotic Pulse (EOP) Treatment For Degrading Porous Material, to McInerney et al., issued Jul. 19, 2005, and both are incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Bea Shahin at 217 373-7234 or Phillip Stewart at 601 634-4113.

BACKGROUND

Groundwater under a building's foundation can cause serious damage. In addition to increased concrete deterioration and accelerated rebar corrosion, basement dampness can ruin expensive electrical and mechanical equipment and can increase maintenance requirements through frequent repainting or cleaning to combat mold growth. Furthermore, the intruding water raises the interior relative humidity thereby accelerating the corrosion rate of mechanical equipment in the area and creating unacceptable air quality and concomitant health problems due to the rapid growth of bacteria and mold.

Groundwater intrusion can also be found in concrete slab foundations and flooring utilized in commercial and residential buildings in areas where the groundwater table is too high to incorporate either a crawl space or basement. Groundwater intrusion can additionally be found in underground parking structures, as well as underground tunnels, roadways and viaducts.

In selective problem areas, the usual approach to the treatment of water intrusion problems is to "trench and drain." In other words, to excavate and expose the wall areas and the base of the foundation, to replace waterproofing on the wall surface, and to install a drain tile system around the building or affected area. Other areas, such as floors, tunnels, viaducts and roadbeds are untreatable using conventional methods.

Electro-osmosis has origins in 1809, when F. F. Reuss originally described experiments demonstrating that water could be forced to flow through a clay-water system when an external electric field was applied to the soil. Research since then has shown that water surrounding the cations moves with them, the flow initiated by the movement of cations present in the pore fluid of a clay, or like porous media such as concrete, brick, and cementitious construction materials. The basic physics and chemistry of electro-osmosis can be found in several textbooks and treatises. Glasstone, S., *Textbook of Physical Chemistry*, 2d ed., D. Van Nostrand Company, Inc., Princeton, N.J., 1946. Tikhomolova, K. P., Electro-Osmosis, Ellis Horwood Limited, Chichester, West Sussex, England, 1993.

Electro-osmosis is typically used to solve the problem of groundwater intrusion, which can cause serious damage to a building's foundation and interiors. Recently, electro-osmosis has been used to address groundwater intruding on roadbeds and viaducts. Electro-Osmotic Pulse (EOP) technology typically offers an alternative that can mitigate some water-related problems from the interior of affected areas, or on the road surface of roadways and viaducts, without the cost of excavation. Examples of such systems are described below.

In one system, humidity is removed from a damp structure by positioning electrodes within the structure and applying a DC voltage across them. U.S. Pat. No. 3,856,646, Methods and Electrodes for the Drying of Damp Buildings, to Morarau, Dec. 24, 1974, incorporated herein by reference.

In another system, chloride ions are removed from concrete by embedding an anode in an electrolyte and establishing an electric current between the anode and the concrete structure in order to avoid corrosion of the concrete's reinforcing means, typically steel rebar. U.S. Pat. No. 5,296,120, Apparatus for the Removal of Chloride from Reinforced Concrete Structures, to Bennett et al., Mar. 22, 1994, incorporated herein by reference.

Another system discloses a process for changing the bond strength between concrete and its steel reinforcement by passing DC current through the concrete. U.S. Pat. No. 5,312,526, Method for Increasing or Decreasing Bond Strength Between Concrete and Embedded Steel, and for Sealing the Concrete-to-Steel Interface, to Miller, May 17, 1994, incorporated herein by reference.

Still another method used to eliminate humidity from concrete uses electro-osmosis to pass current pulses in a predetermined pattern through the concrete. U.S. Pat. No. 5,368,709, Method and Apparatus for Controlling the Relative Humidity in Concrete and Masonry Structures, to Utklev, Nov. 29, 1994, incorporated herein by reference.

A method that claims improvement over existing methods by choice of a narrow range of relationships among the three pulse durations of the pulse train provides longer anode life while optimizing the process of dehydration. U.S. Pat. No. 5,755,945, Method for Dehydrating Capillary Materials, to Kristiansen, May 26, 1998, incorporated herein by reference.

An improvement over previous methods claims to increase anode life while optimizing dehydration and the time to effect it. It uses a specific pulse train in which the positive pulse width is much greater than the negative pulse width that is, in turn, greater than the off period. U.S. Pat. No. 6,117,295, Method for Dehydrating a Porous Material, to Bjerke, Sep. 12, 2000, incorporated herein by reference.

A method that claims to be an improvement over the '709 patent provides a control unit to control the pulse width of individual pulses by monitoring characteristics of the energizing source. U.S. Pat. No. 6,126,802, Method and Device for Regulating and Optimizing Transport of Humidity by Means of Electroosmosis, to Utklev, Oct. 3, 2000, incorporated herein by reference.

A more recent patent proposes a solution to overcome the disadvantage of the '709 patent when used to dehumidify steel-reinforced structures. It specifically prevents the deterioration of the reinforcing steel by providing a second voltage to the reinforcement steel in addition to the typical electro-osmosis configuration of the '709 patent and its predecessors. U.S. Pat. No. 6,270,643 B1, Method for Effecting Fluid Flow in Porous Materials, to Finnebraaten, Aug. 7, 2001, incorporated herein by reference.

In a conventional method, an Electro-Osmotic Pulse (EOP) system is configured by installing anodes (positive electrodes) in the interior wall, floor or ceiling of the structure and cathodes (negative electrodes) in the soil exterior to the structure. Due to the extreme electrochemical environment surrounding the anode, special material and geometry requirements may be placed on an anode intended to be used for other than "trickle current" loads or for extended periods, or both.

Durable, dimensionally stable anodes (DDAs) are a recent development in anode technology. U.S. Pat. No. 5,055,169, to Hock et al., Method of Making Mixed Metal Oxide Coated Substrates, Oct. 8, 1991, and incorporated herein by reference, describes a reactive ion plating process using RF, specifically identifying the rate of evaporation of a noble metal such as ruthenium or iridium, the rate of evaporation of a valve metal such as titanium, and the partial oxygen pressure needed to produce electrically conductive mixed metal oxide ceramic coating on a valve metal substrate. The coated substrate can sustain 150 $A/m^2$ of exposed coating surface in fresh water electrolyte for at least 20 hours, and preferably at least 75 hours, without an excessive increase in the voltage level required to maintain that current density. As noted in the '169 patent abstract, these anodes have excellent characteristics to include: low resistivity, very low dissolution rates, long life, excellent durability, and excellent corrosion resistance. DDAs are also referred to as semiconductive anodes. DDAs generally consist of a valve metal substrate such as niobium, tantalum, titanium or alloys thereof, with a catalytic coating consisting of precious metal(s), most often from the platinum metal group, and often in oxide form in combination with valve metal oxides as a mixed metal oxide.

Anodes have been developed and utilized which consist of a valve metal strip with an electro-catalytic surface. The strip incorporates voids and nodes. The number of nodes may vary from about 200 to about 2,000 nodes per square meter. This configuration is particularly suited for use in cathodic protection of rebar so it is employed in grids of cathodic protection systems for concrete structures. U.S. Pat. No. 5,062,934, Method and Apparatus for Cathodic Protection, to Mussinellil, Nov. 5, 1991 describes cathodic protection of concrete and is incorporated herein by reference.

Conventional EOP systems use "ionic" or "massive" anodes that are consumed over time, thereby separating from the surrounding material while exhibiting decreasing current transfer, eventually reduced to zero. Since the dimensionally stable anode does not change shape, this allows a wider variety of placement options and a practically unlimited lifetime in this application. The wide range of available shapes greatly increases design flexibility. The structure of the anode, wherein the main openings of the grid are delimited by expanded metal strips instead of wires or strands of the prior art, allows for obtaining a further feature. Since iridium and its metal oxide are two of the most chemically inert materials, they are the materials most often chosen for use in the manufacturing of dimensionally stable anodes. Unlike materials conventionally used for EOP anodes, it will not degrade if solvents and many other chemicals are spilled on the floor or wall in which the anodes have been installed. Specifically, iridium based anodes may be employed in both chlorine and oxygen rich environments.

Further, conventional anodes have an anode/porous material contact area represented by the tiny surface of each wire of a strand delimiting each main opening. As a consequence, the electric current concentrates close to the anode/material interface with all the troubles connected to high resistance and low current output, formation of oxygen pockets, and concomitant rapid wear of the coating.

What is needed is a configuration employing grids of durable dimensionally stable anodes (DDAs) that evenly distribute a positive charge in the concrete structure without damaging the anode, concrete, steel reinforcement, or creating acids or outgases at the anodes. Employing such anodes in a system transports water more efficiently and reliably than conventional methods. Additionally, flexibility of design is inherent in the use of DDAs that may be shaped easily to meet specific requirements, thus also facilitating installation. These DDAs may also handle higher current levels than similarly sized non-durable anodes, enabling use in a broader range of applications.

BRIEF DESCRIPTION OF THE DRAWINGS

FIG. 3 is a schematic diagram of select embodiments of the present invention showing the installation of a cathode through a concrete floor.

FIG. 4 at A depicts an installation of a strip DDA for select embodiments of the present invention and at B variations for creating nodes from expanded metal and perforated sheets.

FIG. 5 is a diagram of a voltage waveform that may be used in select embodiments of the present invention.

FIG. 8 is a perspective view of an arrangement of elements of select embodiments of the present invention as may be installed in a concrete roadbed slab.

FIG. 9 shows three separate arrangements of electrodes as may used in select embodiments of the present invention.

DETAILED DESCRIPTION

Figure 2:
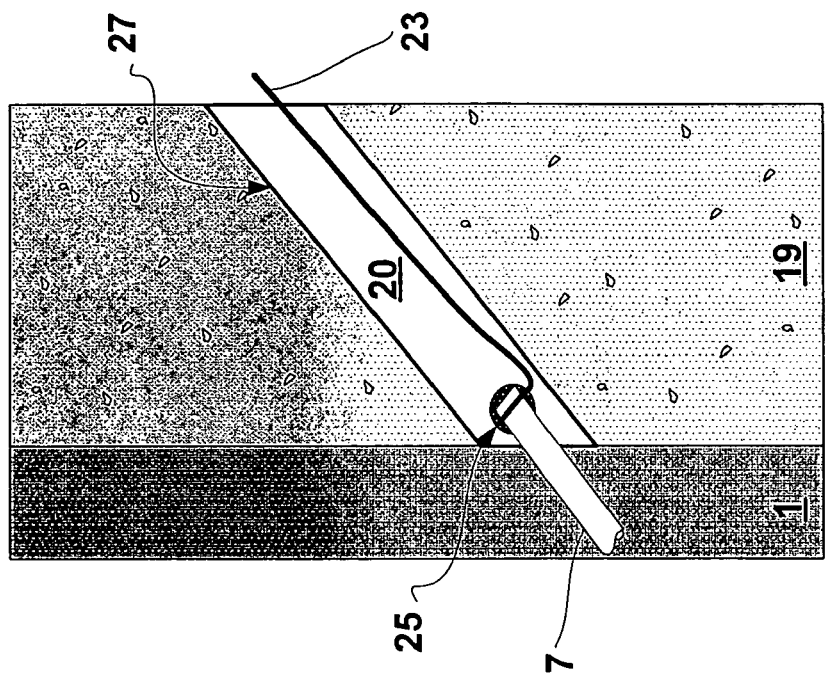
FIG. 2 is a schematic diagram of select embodiments of the present invention showing the installation of a cathode through a concrete wall.

A method controls the amount of fluid, such as water, in porous or capillary materials, such as concrete, via incorporation of durable, dimensionally stable anodes (DDAs) in an array within material.

Further, in select embodiments of the present invention, designs employing semi-conductive coatings produce a durable, dimensionally stable composite anode. Anode coatings may comprise one or more precious metals, precious metal oxides, valve metal oxides, or any combination thereof. The resulting DDA may include metallic, cement, or ceramic coated anodes that are chemically and electrochemically stable.

Suitable electro-catalytic coatings for select embodiments of the present invention have been developed for use as anodic coatings in the industrial electrochemical industry. Coatings of this type have been generally described in U.S. Pat. Nos. 3,265,526; 3,632,498; 3,711,385 and 4,528,084, for example, each of which is incorporated herein by reference. Mixed metal oxide coatings may be used in select embodiments of the present invention. These mixed metal oxide coatings incorporate one or more oxides of a valve metal with an oxide of a platinum group metal, such as platinum, palladium, rhodium, iridium and ruthenium or mixtures of oxides of valve metals and other metals. In select embodiments of the present invention an economic coating is a low-load electro-catalytic coating such as that described in U.S. Pat. No. 4,528,084, incorporated herein by reference.

In select embodiments of the present invention, preferred coatings comprise an oxide of a valve metal and a metal oxide from the platinum group. In select embodiments of the present invention, a mixture of titanium oxide and ruthenium oxide is preferred. In select embodiments of the present invention, another preferred coating is a cobalt spinel ($Co^{2+}$—$MgAl_2O_4$) coating. In select embodiments of the present invention, a platinum and iridium metal interlayer may be inserted between the valve metal substrate and the outer layer of the coating.

In select embodiments of the present invention, the valve metal strip, either in the form of expanded metal sheet or expanded metal strips, is cleaned by suitable means such as solvent-degreasing, pickling and etching, sandblasting, and any combination thereof. In select embodiments of the present invention, the coating is then applied in the form of solutions of appropriate salts of the desired metals and dried. In select embodiments of the present invention, multiple coats are applied to the strips and cured between coatings prior to final coating and final curing.

In select embodiments of the present invention, the electro-catalytic coating is cured at temperatures from about 300° C. to about 600° C. In select embodiments of the present invention, curing times vary from a minimum of about three to about ten minutes for each coating up to a maximum of about one hour. In select embodiments of the present invention, a longer cure time may be employed after several coatings have been applied. In select embodiments of the present invention, the curing operation may comprise any known process used for curing a coating on a metal substrate. In select embodiments of the present invention, oven curing, including conveyor ovens, may be used. In select embodiments of the present invention, infrared cure techniques may be used. In select embodiments of the present invention, oven curing is used with a cure temperature within the range of about 450° C. to about 550° C., with curing times of about three to about ten minutes for each coating.

In select embodiments of the present invention, these DDA arrays may comprise a valve metal strip with an electro-catalytic surface, the strip having voids and nodes. The nodes are provided in an Electro-Osmotic Pulse (EOP) system at a density of about a minimum of 50 nodes per square meter (nodes/$m^2$) with a preference for a minimum of about 2,000 nodes/$m^2$. The external surface of the DDA comprises a corrosion resistant material, e.g., platinum, on a valve metal substrate, such as titanium. Other embodiments may include dispersion in an organic polymer of carbon black or graphite. In select embodiments of the present invention, the DDA may be discrete or, preferably, distributed in an elongated strip. The voids in a valve metal strip may be formed by punching holes therein, but a preferred method is to use an expanded valve metal strip with an expansion of up to 75%. In select embodiments of the present invention, valve metals may be selected from the group consisting of titanium, tantalum, zirconium, niobium, and the like. In select embodiments of the present invention, titanium is preferred because of its strength, corrosion resistance, availability and cost. In select embodiments of the present invention, valve metals may also be used in the form of metal alloys and inter-metallic mixtures. In select embodiments of the present invention, these strips may be formed in a variety of ways. For example, a coil of a sheet of a valve metal, e.g. titanium, is passed through an expanding apparatus, and the expanded metal is cut into strips of the desired width.

A DDA incorporated in a valve metal strip with an electro-catalytic surface, i.e., a "strip DDA," does not change shape over time; is inexpensively and readily manufactured in any shape, such as a strip, a wire, a cylinder, an elongated cylinder, or a torus; and is chemically inert, thus impervious to degradation.

Further, a strip DDA of the present invention enables higher current densities for the same anode geometry or enables a reduction in the size of individual anodes to achieve a given current density. The anode-to-material contact area is distributed along the length and width of the strips preventing any harmful current flow concentration. The advantages of the strip DDA configuration include reduction in:
  resistance, permitting a higher current output with the same applied voltage;
  oxygen production at the DDA/material interface, thus preventing the formation of gas pockets and acid buildup capable of interrupting electrical continuity; and
  wear of a coating that employs only inexpensive (thin) layers of noble metal.

Select embodiments of the present invention also provide an improved method of installing an EOP system for controlling the movement of fluids, such as water, through porous or capillary materials, such as concrete. One embodiment involves inserting into the porous material a strip DDA comprising a valve metal strip having an electro-catalytic surface, the strip having voids and nodes, the nodes being of a density of a minimum of 50 nodes/$m^2$, and preferably about 2,000 nodes/$m^2$. Embodiments of the method also locate one or more cathodes in operable communication with the strip DDA(s), but in an area remote from the porous material. A pre-specified signal is applied to the EOP system, creating an electromagnetic field in the porous material that causes cations, and associated water molecules attached thereto, to move from the nodes of the strip DDA(s) to the cathode(s).

Select embodiments of the present invention provide a method for safely de-watering porous material by employing one or more arrays of durable dimensionally stable anodes (DDAs) in a de-watering system comprising the DDAs, one or more cathodes communicating with the arrays and a second material external to the porous material, one or more sources of a DC electrical signal communicating with the arrays and the cathode(s) and one or more monitoring and control devices communicating with the porous material and the source, the DDAs comprising strip DDAs, each strip comprising a valve metal having an electro-catalytic surface, each strip having voids and nodes, the nodes being distributed on the strip in a range of densities of a minimum of about 50 nodes/$m^2$ to a minimum of about 2000 nodes/$m^2$. The method comprises: measuring selected parameters of the porous material and the environs of it; comparing the selected parameters to known data; establishing operating parameters of the de-watering system; connecting the de-watering system to at least part of the porous material to facilitate implementing the established operating parameters; establishing an osmotic flow of moisture from within at least some of the porous material, such that osmotic flow dewaters at least part of the porous material, and monitoring the osmotic flow and the porous material to maintain a pre-specified level of moisture in the porous material.

In select embodiments of the present invention, the method provides the strip DDA as a strip of expanded valve metal mesh comprising valve metal wire with an electro-catalytic surface comprising a coating containing one or more metal oxides as oxides of metals from the platinum group.

In select embodiments of the present invention, the method provides the electro-catalytic surface as a cobalt spinel coating.

In select embodiments of the present invention, the method provides the electro-catalytic surface as a mixed metal oxide coating of first and second metal oxides, the first metal oxide comprising an oxide of a valve metal selected from the group comprising titanium, tantalum, niobium and combinations thereof, and the second metal oxide selected from the group comprising oxides of platinum, palladium, rhodium, iridium, ruthenium, and combinations thereof.

In select embodiments of the present invention, the method further comprises connecting one or more strip DDAs to the porous material by creating a slit in the porous material, placing the strip DDA in the slit, and filling any void surrounding the strip DDA with a conducting grout.

In select embodiments of the present invention, the method further provides for using multiple strip DDAs communicating with each other to form one or more grids distributed over at least a portion of the porous material.

In select embodiments of the present invention, the method permits variations in current density within the porous material by employing at least one means from the group comprising: varying the dimensions of the strip DDAs, varying the spacing of the voids and nodes on the strip DDAs, varying the spacing of the DDA strips in the grid, and combinations thereof.

In select embodiments of the present invention, the method comprises establishing an electro-osmotic flow by employing the de-watering system to apply a current of a minimum of approximately 400 mA/m$^2$ of surface of the strip DDA to at least part of the porous material.

In select embodiments of the present invention, the method comprises establishing an electro-osmotic flow by employing the de-watering system to apply a current of a minimum of approximately 21.3 mA/m of lineal length of the strip DDA.

In select embodiments of the present invention, the method comprises placing the grid in a channel approximately 13 mm wide and approximately 38 mm deep in the porous material and filling the channel with conducting grout.

In select embodiments of the present invention, the method is applied to porous material comprising concrete.

In select embodiments of the present invention, a system is provided for safely de-watering porous material. The system comprises: one or more arrays of durable dimensionally stable anodes (DDAs), the DDAs comprising strip DDAs, each strip DDA comprising a valve metal having an electro-catalytic surface, each strip DDA having voids and nodes, the nodes being distributed on the strip in a range of densities of a minimum of about 50 nodes/m$^2$ to a minimum of about 2000 nodes/m$^2$; one or more cathodes communicating with the array and communicating with a second material external to the porous material; one or more sources of a DC electrical signal communicating with at least the array and the cathode; one or more monitoring and control devices communicating with at least the porous material and the array, such that monitoring enables maintenance of a pre-specified level of moisture in the porous material, and such that the system establishes an osmotic flow of moisture from within at least some of the porous material to the cathode(s), the osmotic flow dewatering at least part of the porous material.

In select embodiments of the present invention, the DDA strip is a strip of expanded valve metal mesh comprising valve metal wire and the electro-catalytic surface comprises a coating containing one or more metal oxides of the platinum group.

In select embodiments of the present invention, the system employs strip DDAs having an electro-catalytic surface comprising a cobalt spinel coating.

In select embodiments of the present invention, the electro-catalytic surface comprises a mixed metal oxide coating of first and second metal oxides, the first metal oxides comprising an oxide of a valve metal selected from the group consisting of titanium, tantalum, niobium and combinations thereof, and the second metal oxide selected from the group consisting of oxides of platinum, palladium, rhodium, iridium, ruthenium, and combinations thereof.

In select embodiments of the present invention, the system comprises a conducting grout for embedding the array(s) in the porous material.

In select embodiments of the present invention, the system comprises multiple strip DDAs communicating with each other to form one or more grids distributed over at least a portion of the porous material.

In select embodiments of the present invention, the system protects porous material comprising concrete.

Select embodiments of the present invention provide a strip durable dimensionally stable anode (DDA) comprising a valve metal having an electro-catalytic surface, each strip having voids and nodes, the nodes being distributed on the strip in a range of densities of a minimum of about 50 nodes/m$^2$ to a minimum of about 2000 nodes/m$^2$.

In select embodiments of the present invention, the strip DDA comprises an expanded valve metal mesh of valve metal wire with the electro-catalytic surface comprising a coating containing one or more metal oxides of the platinum group.

In select embodiments of the present invention, the strip DDA has an electro-catalytic surface comprising a cobalt spinel coating.

In select embodiments of the present invention, the strip DDA has an electro-catalytic surface comprising a mixed metal oxide coating of first and second metal oxides, the first metal oxide comprising an oxide of a valve metal selected from the group consisting of titanium, tantalum, niobium and combinations thereof, and the second metal oxide selected from the group consisting of oxides of platinum, palladium, rhodium, iridium, ruthenium, and combinations thereof.

Further, in select embodiments of the present invention, employing conductive grouts with strip DDAs of the present invention increases effective surface area of the individual anodes, permitting more current to be transferred while reducing any impedance mismatch effects due to high current densities at the anode-material interface of conventional installations. Compared to conventional EOP-based systems, employing strip DDAs of the present invention and conductive grouts allows the interior surface moisture to be reduced below 55% relative humidity (RH) and maintained for a longer period without replacement of the anodes.

In select embodiments of the present invention, an electro-osmotic system employing strip DDAs of the present invention inserts an electric field in porous material in a pre-specified pattern and over a pre-specified cycle for the purpose of creating an evenly distributed positive charge through the material in the areas over which the strip DDAs are distributed. In select embodiments of the present invention, the system operates within pre-specified parameters including, but not limited to, a pre-specified pulse train of energy at a pre-specified amplitude level in a pre-specified cycle for a pre-specified time. The pre-specified parameters are determined by relating measurements, e.g., resistivity, taken from the structure and its surrounding environs to known data. In its normal mode of operation, the system is operated at a level that eliminates the possibility of damaging electrical shock to workers installing and operating it.

In select embodiments of the present invention, the pre-specified pulse train comprises a first positive DC voltage pulse of a first pre-specified duration, a second negative DC voltage pulse of a second pre-specified duration, and a zero DC voltage period of a third pre-specified duration. To attain a goal of reducing the level of shock hazard to workers in its normal mode of operation, select embodiments of the present invention operate at a nominal voltage of 40 V DC or less, with pulse widths in the range of about 1 second to about 60 seconds. In select embodiments of the present invention, the first pulse is a positive pulse with a greater pulse width than the second negative pulse. The off period, or zero-voltage pulse, normally is of a longer duration than the negative pulse. This pulse train is continued until the porous material is determined to be sufficiently dehydrated. Thereafter, the material is monitored and maintained to repel water intrusion or maintain a level of moisture within a pre-specified range.

In select embodiments of the present invention, a system comprises one or more strip DDAs, each comprising a valve metal strip having an electro-catalytic surface, each strip having voids and nodes, the nodes being distributed at a minimum density of about 50 nodes/m², and preferably about 2,000 nodes/m². Individual DDAs may be fabricated using a process detailed in U.S. Pat. No. 5,062,934, Method and Apparatus for Cathodic Protection, to Mussinellil, Nov. 5, 1991, incorporated herein by reference. Each strip DDA of the present invention is in electrical communication with the porous material and one or more cathodes that complete the circuit between the strip DDAs and a power supply. A pathway is established between each strip DDA and a corresponding cathode(s) to carry energy from the power supply to create the electric field that establishes an electro-osmotic flow of moisture from the material. In select embodiments of the present invention, the system is operated within pre-specified parameters including, but not limited to: a pre-specified pattern of disposition of the strip DDAs and cathodes within the material, energy in the form of a pulsed DC voltage at a pre-specified voltage level with a pre-specified cycle of pulses, i.e., a repeating pulse train having a pre-specified number of pulses of a pre-specified type and pre-specified pulse duration.

A common type of porous material targeted for EOP treatment is concrete, including concrete reinforced with steel, although other types of durable porous material, such as brick, concrete block, and composite masonry material, may also be targeted. In select embodiments of the present invention, the cathode is a rod in electrical communication with the earth and the anode is one or more strip DDAs embedded in the material. In select embodiments of the present invention, the strip DDAs may be electrically connected to the material via an electrically conducting coating on the surface of the material.

In select embodiments of the present invention, the system may be operated to provide a current not to exceed 40 mA/ft² of surface area of the strip DDA to ensure against the formation of out gas or acids in the porous material.

Also provided is a method of implementing a system representing an embodiment of the present invention. A method for installing the strip DDAs in porous material using an EOP system operated at a voltage level low enough to ensure against the formation of out gases or acids in the porous material, comprises: measuring selected parameters of the material and its surrounds; comparing the selected parameters to known data; establishing operating parameters of the EOP system; connecting the EOP system to the porous material in accordance with the established operating parameters; establishing an osmotic flow of moisture from within the porous material using the established operating parameters to operate the EOP system; and optimizing the life of strip DDAs selected for the process, by employing durable dimensionally stable anodes comprising a valve metal strip with an electro-catalytic surface, each of the strip DDAs having voids and nodes, the nodes being of a minimum density of 50 nodes/m2 and preferably of a minimum density of at least 2,000 nodes/m².

In select embodiments of the present invention, a DC power supply is part of the EOP system.

In select embodiments of the present invention, the method provides the cathodes as metal rods. In select embodiments of the present invention, the method provides the cathodes as perforated metal pipes. In select embodiments of the present invention, the method provides the perforated pipes wrapped with one or more geotextiles.

Figure 1:
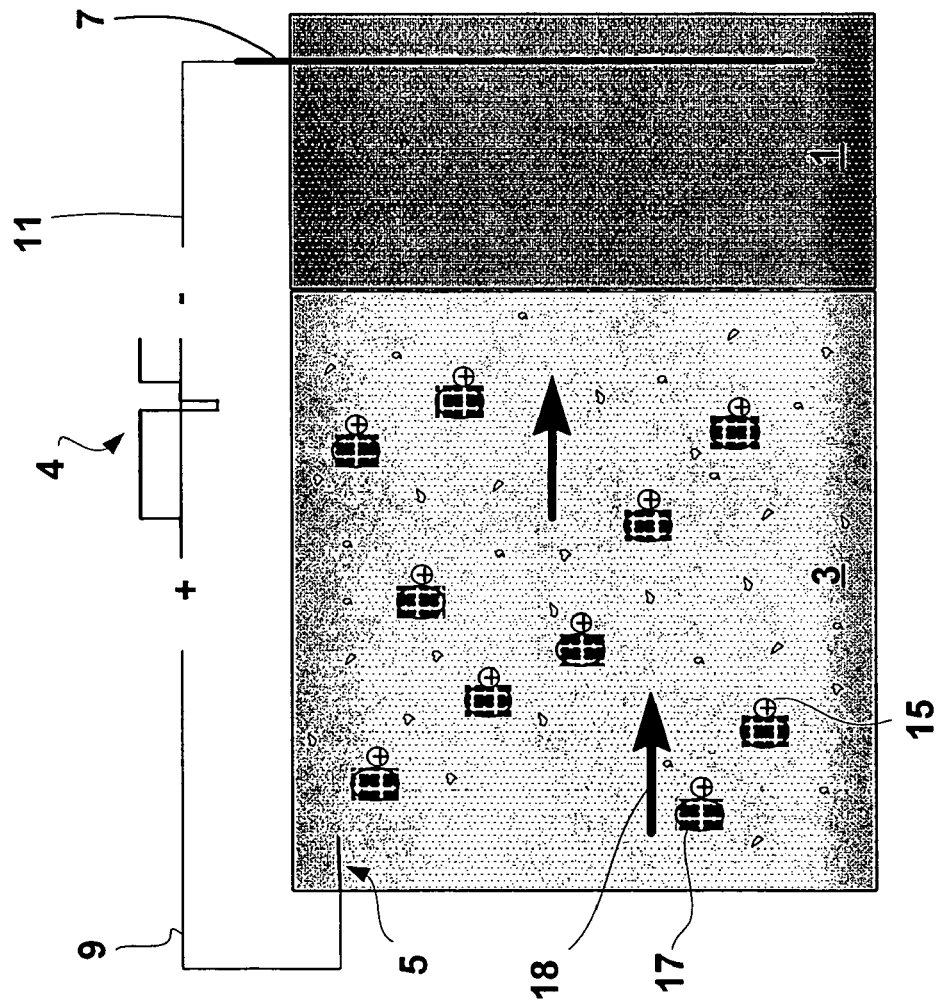
FIG. 1 is a schematic diagram of elements as used in select embodiments of the present invention.

Refer to FIG. 1. In select embodiments of the present invention, one or more strip DDAs 5 of the present invention, that may be produced via the process detailed in the '934 or '169 patents, are inserted into a concrete slab 3. In select embodiments of the present invention, the strip DDAs 5 are embedded in the slab 3 using mortar or conductive grout. In select embodiments of the present invention, one or more cathode rod(s) 7, typically copper-clad steel grounding rods, are emplaced in the soil 1 directly outside the slab 3. As depicted in FIG. 1, the cathode rods 7 may be placed a short distance, e.g., two meters, from the slab 3. Hard wires 9, 11 are used to form the circuit containing strip DDAs 5, the cathode rods 7 and a DC power supply 4. The placement and number of strip DDAs 5 and cathode rods 7 is determined from an initial resistivity test of the slab 3 and soil 1. The objective is to achieve a pre-specified current density that creates an electric field strength in the slab 3 sufficient to overcome the force exerted by the hydraulic gradient on the water molecules 17 enclosed therein. When the system is energized, the cations 15, e.g., $Ca^{2+}$, and water molecules 17 in the concrete slab 3 flow in the direction of the arrows 18 towards the cathode rod(s) 7, thus "de-watering" the concrete slab 3 to a specified maintenance level and effectively treating further water intrusion.

Refer to FIG. 2 depicting a concrete wall 19 adjacent the soil 1. Because a good earth ground is not always readily accessible inside the wall 19 needed to be treated, a borehole 20 may be drilled through the wall 19. A cathode rod 7, e.g., a copper clad steel rod or rebar typically of one-inch diameter, is inserted in the borehole 20, together with a cathode wire 23 suitably attached to the free end of the cathode rod 7 and encapsulated with an insulating material 25, such as epoxy, as insulation from the wall 19. The cathode rod 7 may extend from and through the soil 1 to the wall 19. Not shown in FIG. 2, but understood, is the cathode wire 23 extending from the wall 19 to where it is joined to the external DC power supply 4. Encapsulating the wall 19 abutting the borehole, the inserted portion of the cathode rod 7 and the insulating compound 25 is a sealing and insulating compound 27, such as epoxy, used to isolate the borehole 20 and its contents from the wall 19.

Refer to FIG. 3, providing a view similar to FIG. 2 but for a concrete floor poured above a suitable base of gravel and soil 1.

Refer to FIG. 4. At A, a strip DDA 5 of the present invention is depicted in use as inserted in a previously formed groove 8 in a concrete structure 29. Non-shrink grout 33 extends around the strip DDA 5. The strip DDA 5 may comprise a base material of a valve metal, typically titanium, and an electrically conducting oxide layer, such as a conductive ceramic coating. The electrically conductive ceramic coating may comprise a dual phase mixture of iridium, tantalum and titanium oxides. Although the exact composition for this ceramic coating may vary, it may generally comprise a mixed metal oxide film incorporating a dual phase mixture of $TiO_2$ (rutile) and $RuO_2$ (ruthenium oxide) or $IrO_2$ (iridium oxide), or both. In select embodiments of the present invention, it is desirable that the ceramic coating have a resistivity less than 0.002 ohm-centimeter ($\Omega$-cm) and bond strength greater than 50 MPa. Three configurations that may be used with select embodiments of the present invention are shown in perspective detail at B. The diamond structure 30, if distributed evenly over the surface to be protected results in coverage that would be similar to laying a chain-link fence over the structure. The basket weave fence pattern 31 provides more dense coverage and may permit lower current levels to be used. The perforated plate pattern 32 may be suitable for easy installation in the top surface of freshly poured concrete while providing good overall coverage of the structure's surface. A ceramic-coated strip DDA 5 of the present invention should be chemically inert and the electrically conductive ceramic coating dimensionally stable. Further, in select embodiments of the present invention the strip DDA 5 should be able to sustain a linear current density of 100 ampere/meter (A/m) in an oxygen-generating electrolyte at 65° C. (150° F.) for 20 years in order to maintain necessary current carrying capacity. In select embodiments of the present invention, other types of DDAs, including those having different conductive coatings, may be used. One such coating, described in the '169 patent, is an electrically conducting coating that is able to sustain a current density of approximately 150 $A/m^2$ of exposed coating surface in fresh water electrolyte for at least 75 hours without a significant increase in the voltage level required to maintain that current density.

Refer to FIG. 5. In select embodiments of the present invention, the operating cycle of the DC power supply 4 is represented by one or more positive pulses of duration $T_1$, one or more negative pulses of duration $T_2$, and one or more off periods of duration $T_3$. T is the total elapsed time for one operating cycle. Referring to FIG. 1, as a result of pulsing the energy as described above, the pore fluid 17 in the concrete 3 moves toward the cathode rod 7 efficiently. Typically, the positive voltage pulse has the longest pulse width of $T_1$ and the negative voltage pulse with a width of $T_2$ is even shorter than the off period, $T_3$. In some applications, the pulse width $T_1$ equals T, representing the degenerative case of a constant direct-current voltage of amplitude V being applied. The voltage, V, and pulse durations, $T_i$, of the pulse train are application dependent. Generally, assuming significant moisture within the concrete, the rate of moisture removal is directly proportional to the voltage, i.e., the greater the voltage the greater the rate of moisture removal.

Figure 6:
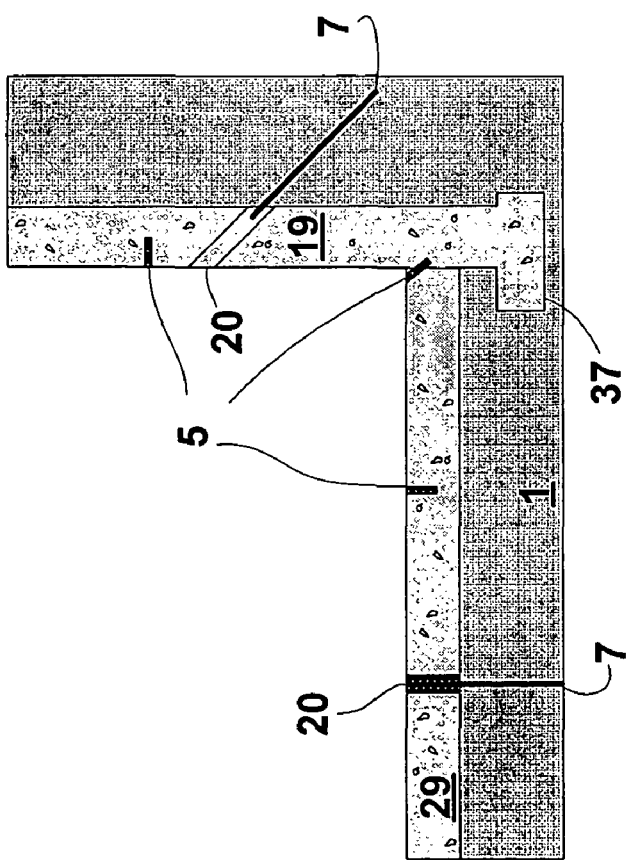
FIG. 6 is a cut away view of some elements of a system installation that may be used in select embodiments of the present invention.

Refer to FIG. 6. A concrete wall 19 and concrete floor 29 each have the cathode rod 7 inserted as illustrated in more detail in FIG. 3 and the strip DDA 5 as depicted with grout 33 in more detail in FIG. 4 at A. The strip DDA 5 (also as shown with grout 33 in FIG. 4 at A) is inserted in a groove (FIG. 6) at the junction of the wall 19 and floor 29 and may also be inserted higher on the wall and in the floor 29 as shown at representative locations in FIG. 6. The strip DDA 5 is placed at a depth of about 38 mm (1½) into the floor 29. Preferably, the grout 33 (as shown in FIG. 4 at A) forms a channel of about 13 mm (1½) in diameter.

In addition, a conventional concrete footing 37 may be located below ground level under the wall 19. By installing the strip DDA 5 in the juncture between the wall 19 and floor 29, the wall 19 and floor 29 both may be energized by a single strip DDA 5 placed in the junction of the wall 19 and floor 29. The cathode 7, typically of a length of about 60-120 cm, is inserted through the a hole 20 in the concrete floor 29 and having suitable insulating epoxy 27 (as shown in FIG. 3) encapsulating it for the length of its insertion in the floor 29, is spaced about 60 cm from the strip DDA 5.

Figure 7:
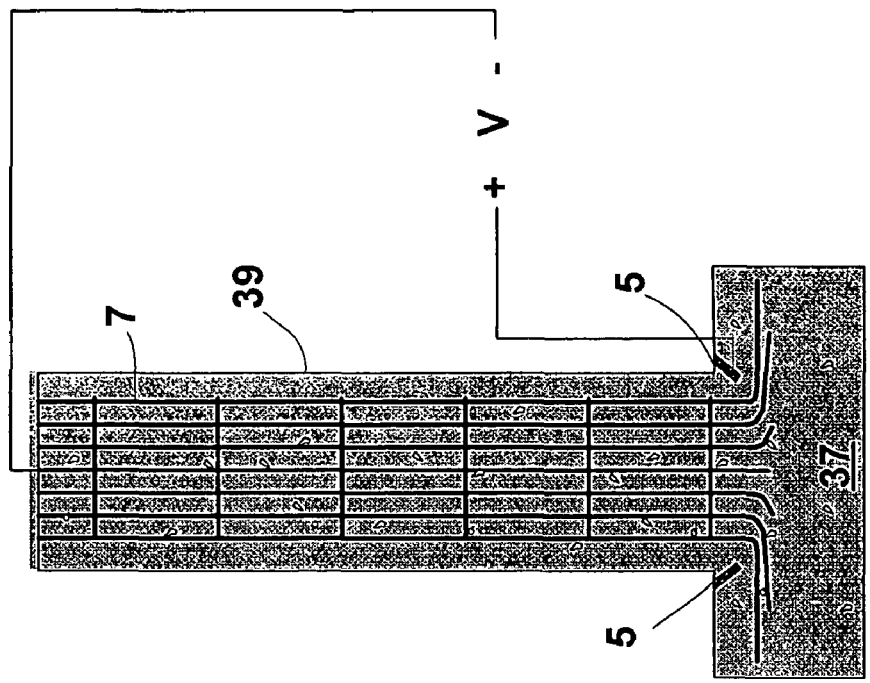
FIG. 7 depicts a system utilizing reinforcing steel as a cathode that may be used with select embodiments of the present invention.

Refer to FIG. 7 depicting a system that may be used in select embodiments of the present invention. The system utilizes reinforcing steel 7 as the cathode in a concrete column 39 installed above concrete footing 37. The footing 37 provides a base support for the column 39, as would be used in a structure, e.g., a building or bridge. The strip DDA 5 is placed in grout 33 (shown in detail in FIG. 4 at A) at the intersection of the column 39 and footing 37 as is also shown in FIG. 6.

Refer to FIG. 8, In select embodiments of the present invention a DC power source 4 (FIG. 1) is connected to a strip DDA 5 and cathode rods 7 (as shown in FIG. 1) in a concrete slab 3. In the embodiment of FIG. 8, the area 37 represents an electrically conductive coating that may be applied to the slab 3 to facilitate conduction. Using this coating 37 as a DDA or cathode may be accomplished by placing a wire from the DC power source 4 to one side 49 of the coating 37 and a wire to an electrode 51 on the surface of the concrete slab 3 opposite that of the coating 37.

Refer to FIG. 9. The three methods of connecting to a concrete structure described above are illustrated side by side. The first method, as illustrated at A, involves connecting strip DDAs 5 and rods 7 by embedding the strip DDAs 5 in the concrete slab 3 and the rods 7 in the soil (as in FIG. 1) and running hard wires 9, 11 (as in FIG. 1) from each to a DC power supply 4 or by providing the DDAs as an electrically conductive surface coating 37 as shown in FIG. 8. Note that in any of the three examples, each side of the concrete slab 3 may be configured differently, so that side 1 may be configured as shown at A where only strip DDAs 5 and rods 7 are used and side 2 may be configured as shown at B where a conductive coating 37 is added. Finally, all connections to the slab may be via only a conductive coating 37 as shown at C.

Although specific types of electro-osmotic configurations are discussed, other similar configurations or methods, including those that may have only some of the constituents or steps used in the above examples, may be suitable for dehydrating porous material while minimizing formation of gasses and acids and thus fall within the ambit of select embodiments of the present invention as provided in the claims herein.

Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract of the disclosure is provided to comply with the rules requiring an abstract that will allow a searcher to quickly ascertain the subject matter of the technical disclosure of any patent issued from this disclosure. 37 CFR §1.72 (b). Any advantages and benefits described may not apply to all embodiments of the invention.

We claim:

1. A customized method for safely, efficiently and reliably de-watering porous material, including porous material incorporating steel reinforcement, comprising:
providing a de-watering system, comprising;
at least one array of durable dimensionally stable anodes (DDAs), said DDAs comprising strip DDAs, each said strip comprising a valve metal having an electro-catalytic surface, each said strip having voids and nodes, said nodes being distributed on said strip in a range of densities of a minimum of about 50 nodes/m$^2$ to a minimum of about 2000 nodes/m$^2$,
at least one cathode in operable communication with said at least one array and in operable communication with a second material external to said porous material,
at least one source of a DC electrical signal in operable communication with said at least one array and said at least one cathode;
at least one monitoring and control apparatus in operable communication with at least said porous material and said at least one source,
wherein said monitoring and control apparatus monitors at least the amount of moisture in said porous material and at least controls the rate of said de-watering;
measuring selected parameters of said porous material, said second material and the environs of said porous and said second materials;
comparing said selected parameters to known data;
establishing operating parameters of said de-watering system;
connecting said de-watering system to at least part of said porous material to facilitate implementing said established operating parameters;
establishing an osmotic flow of moisture from within at least some of said porous material,
wherein said osmotic flow dewaters at least part of said porous material, and
monitoring said osmotic flow and said porous material to maintain a pre-specified level of moisture in said porous material,
wherein deployment of said de-watering system evenly distributes a positive charge in the porous material without damaging said DDAs, said porous material, any said steel reinforcement that may be incorporated in said porous material, and without creating acids or causing out-gassing at said DDAs.

2. The method of claim 1 providing said DDAs in a strip of expanded valve metal mesh comprising valve metal wire and providing said electro-catalytic surface as a coating containing at least one metal oxide of the platinum group.

3. The method of claim 2 further comprising connecting at least one said strip DDA to said porous material by creating a slit in said porous material, placing said strip DDA in said slit, and filling any void surrounding said strip DDA with a conducting grout.

4. The method of claim 2 further providing multiple said strip DDAs in operable communication with each other to form at least one grid distributed over the surface of at least a portion of said porous material.

5. The method of claim 4 providing said grid to permit variations in current density within said porous material by employing at least one means from the group consisting of: varying the dimensions of said strip DDAs, varying the spacing of said voids and nodes on said strip DDAs, varying the spacing of said DDA strips in said grid, and combinations thereof 6. The method of claim 4 further comprising placing each said strip DDA in said grid in a channel approximately 13 mm wide and approximately 38 mm deep in said porous material and filling each said channel with conducting grout.

7. The method of claim 1 further comprising establishing said electro-osmotic flow by employing said de-watering system to apply a current of at least approximately 400 mA/m$^2$ of surface of said strip DDA to at least part of said porous material.

8. The method of claim 2 further comprising establishing said electro-osmotic flow by employing said de-watering system to apply a current of at least approximately 21.3 mA/m of lineal length of said strip DDA.

9. The method of claim 1 providing said electro-catalytic surface as a cobalt spinel coating.

10. The method of claim 1 providing said electro-catalytic surface as a mixed metal oxide coating of first and second metal oxides, said first metal oxide comprising an oxide of a valve metal selected from the group consisting of titanium, tantalum, niobium and combinations thereof, and said second metal oxide selected from the group consisting of oxides of platinum, palladium, rhodium, iridium, ruthenium, and combinations thereof.

11. The method of claim 1 said porous material comprising concrete.

12. The method of claim 11 said concrete comprising steel reinforced concrete.

13. The method of claim 1 providing said at least one cathode as at least one steel rod.

14. The method of claim 1 providing said at least one cathode as perforated metal pipe.

15. The method of claim 14 providing said perforated metal pipe wrapped with at least one geotextile.

16. The method of claim 1 said monitoring and control apparatus employing at least one device for detecting moisture content of said porous material.

17. The method of claim 1 said monitoring and control apparatus employing at least one device for determining osmotic flow rate from said porous material.

18. The method of claim 1 said second material comprising soil.

19. A customized method for safely, efficiently and reliably de-watering porous material, including porous material incorporating steel reinforcement, comprising:
providing a de-watering system, comprising:
at least one array of durable dimensionally stable anodes (DDAs), said DDAs comprising strip DDAs, each said strip comprising a valve metal having an electro-catalytic surface, each said strip having voids and nodes, said nodes being distributed on said strip in a range of densities of a minimum of about 50 nodes/m$^2$ to a minimum of about 2000 nodes/m$^2$,
at least one cathode in operable communication with said at least one array and in operable communication with a second material external to said porous material,
at least one monitoring and control apparatus in operable communication with at least said at least one array, said porous material and said at least one source,
wherein said monitoring and control apparatus monitors at least the amount of moisture in said porous material and at least controls the rate of said de-watering;
measuring selected parameters of said porous material, said second material and the environs of said porous and said second materials;
comparing said selected parameters to known data;

establishing operating parameters of said de-watering system;

connecting said de-watering system to at least part of said porous material to facilitate implementing said established operating parameters;

establishing an osmotic flow of moisture from within at least some of said porous material, wherein said osmotic flow dewaters at least part of said porous material, and monitoring said osmotic flow and said porous material to maintain a pre-specified level of moisture in said porous material, wherein deploying said de-watering system evenly distributes a positive charge in the porous material without damaging said DDAs, said porous material, any said steel reinforcement that may be incorporated in said porous material, and without creating acids or causing out-gassing at said DDAs.

20. The method of claim 19 further providing at least one source of a DC electrical signal in operable communication with at least said at least one array and said at least one cathode.

21. The method of claim 20 cycling said DC electrical signal, wherein a single cycle of said DC electrical signal comprises a pulse train of an initial positive pulse followed by a shorter duration negative pulse and ends with a short off period before re-cycling.

22. The method of claim 1 cycling said DC electrical signal, wherein a single cycle of said DC electrical signal comprises a pulse train of an initial positive pulse followed by a shorter duration negative pulse and ends with a short off period before re-cycling.

* * * * *